United States Patent Office 3,232,741
Patented Feb. 1, 1966

3,232,741
FERTILIZER MANUFACTURE CONTAINING AMMONIUM NITRATE AND MONOAMMONIUM PHOSPHATE
Donald Harold Booth, Carleton, near Pontefract, and Geoffrey Naylor Quinton, Kirton, near Ipswich, England, assignors to Fisons Fertilizers Limited, Suffolk, England
No Drawing. Filed Jan. 30, 1963, Ser. No. 255,079
Claims priority, application Great Britain, Feb. 8, 1962, 4,834/62
6 Claims. (Cl. 71—39)

The present invention relates to the preparation of fertilizers containing ammonium nitrate and monoammonium phosphate.

It is kown that mixtures of ammonium nitrate and monoammonium phosphate may be made by ammoniation of nitric and phosphoric acids and that the product may be mixed with other materials. In order to avoid the formation of thick and viscous slurries which are impossible to handle and process it has been considered necessary to effect the ammoniation in the presence of fairly large quantities of water. The precise amount of water varied with the relative proportions of ammonium nitrate to monoammonium phosphate but was never less than 11% by weight of water and might have been as much as 25% by weight of water as the proportion of phosphate increased, the percentage being based on the weight of the product comprising ammonium nitrate, monoammonium phosphate and water. Obviously such large quantities of water are undesirable requiring as they do expensive granulation and drying stages. The necessity of using these large amounts of water also prevents full utilisation of the heat of reaction of ammoniation.

It is also known that melts can be obtained by fusing mixtures of ammonium nitrate and monoammonium phosphate, these melts being anhydrous or containing only small amounts of water. Melts of this nature which are anhydrous or contain only small amounts of water cannot however be formed by the straightforward ammoniation of the mixture of phosphoric acid and nitric acids as has been suggested. In fact if it is attempted to make a substantially anhydrous melt comprising ammonium nitrate and monoammonium phosphate by simply reacting anhydrous ammonia with a mixture of phosphoric and nitric acids the mixture becomes so hot that the ammonia is not absorbed. It has now surprisingly been found that at water levels appreciably less than the 11% by weight previously considered a minimum but at a level above 2% by weight based on the weight of the product comprising ammonium nitrate, monoammonium phosphate and water, a substantially homogeneous liquid mixture of ammonium nitrate and monoammonium phosphate at or near its boiling point can be formed by ammoniation of a mixture containing at least nitrate and phosphate anions, hydrogen cations and water. At water levels below 2% by weight the boiling point of the homogeneous liquid mixture is so high as to cause decomposition of the nitrate and/or phosphate and the ammoniation becomes impracticable.

Accordingly the present invention is for a process for the production of compound fertilizers which comprises ammoniating an acid mixture containing at least phosphate and nitrate anions, hydrogen cations and water to given a substantially homogeneous liquid mixture comprising ammonium nitrate, monoammonium phosphate and water maintained at or near its boiling point, recovering the substantially homogeneous liquid mixture and processing it to obtain a fertilizer product, preferably a granular fertilizer product, the homogeneous liquid mixture having (1) a weight ratio $N:P_2O_5$, as calculated from the N-content of the ammonium nitrate and the monoammonium phosphate and the $P_2O_5$ content of the monoammonium phosphate, in the range 0.64 to 2.1, (2) a boiling point greater than T° C., T being equal to $$158(N:P_2O_5)^{-0.11}$$

preferably being equal to $$164(N:P_2O_5)^{-0.11}$$

and (3) a water content which is at a level between a minimum value of 2% by weight and a maximum value of W% by weight, the percentage weight being based on the weight of the homogeneous liquid mixture and W being equal to $(2+4N:P_2O_5)$.

The term monoammonium phosphate as used in the present specification covers compounds in which the $NH_3:H_3PO_4$ molecular ratio is in the range 0.9:1 to 1.1:1. Also throughout this specification the $N:P_2O_5$ ratio is calculated from the nitrogen content of the ammonium nitrate and monoammonium phosphate and the $P_2O_5$ content of the monoammonium phosphate.

In one embodiment of the present invention the acid mixture is ammoniated in the presence of the substantially homogeneous liquid mixture comprising ammonium nitrate, monoammonium phosphate and water, the characteristics of which are defined above. In this embodiment the acid mixture is preferably ammoniated by a process which comprises adding phosphate and nitrate anions, hydrogen cations, ammonia and water to a pool of said homogeneous liquid mixture in such proportions and such conditions as to maintain the homogeneous liquid mixture at an $N:P_2O_5$ weight ratio in the range 0.64 to 2.1, at a boiling point greater than T° C. where T is equal to $158(N:P_2O_5)^{-0.11}$, and at a water content between a minimum value of 2% by weight and a maximum value of $$(2+4N:P_2O_5)$$

by weight based on the weight of the homongeneous liquid mixture. Preferably this embodiment of the present invention is carried out in one or more stirred tank reactors.

If the ammoniation of the acid mixture is carried out without the formation of a pool of homogeneous liquid mixture the process of the present invention may be carried out in one or more tubular reactors or packed towers. When the ammoniation is performed in a tubular reactor the temperature along the tube gradually rises as the degree of ammoniation rises eventually exceeding the minimum temperature T° C. defined above.

The ammoniation step according to the present invention is preferably carried out at atmospheric pressure but may be carried out under increased or reduced pressure.

The phosphate and nitrate anions may be added in the form of phosphoric acid, nitric acid, monoammonium phosphate or ammonium nitrate. The hydrogen cations may be added as sulphuric acid, phosphoric acid or nitric acid. The ammonium cations may be added as monoammonium phosphate, ammonium nitrate or ammonium sulphate. The sulphate anions may be added as sulphuric acid or ammonium sulphate. These ionic materials may be mixed together or added to the homogeneous liquid mixture comprising ammonium nitrate, monoammonium phosphate and water, along with ammonia and perhaps water. The ammonia reacts with the hydrogen cations to form ammonium salts and at the same time liberates heat thus maintaining the temperature of the homogeneous liquid mixture, and evaporating any excess water present. Sulphuric acid may be added to the acid mixture in order to increase the heat of neutralisation but the amount of ammonium sulphate produced should be less than 20% of the weight of the mixture.

The acid mixture preferably comprises a mixture of phosphoric acid and nitric acid or of phosphoric acid and ammonium nitrate. Preferably these mixtures are concentrated, the nitric acid and phosphoric acid being at least 40, preferably at least 50% strength. Superphosphoric acid may also be used with advantage.

The temperature of the homogeneous liquid mixture comprising ammonium nitrate, monoammonium phosphate and water is maintained at or near the boiling point of the mixture. The boiling point of a mixture of given $N:P_2O_5$ ratio varies according to the amount of water present within the given limits of 2% and $(2+4N:P_2O_5)\%$. Where the $N:P_2O_5$ ratio is 0.4, for instance the minimum boiling point is about 175° C. and corresponds to a water content of about 3%. In contrast when the $N:P_2O_5$ ratio is 1.5 the minimum boiling point is about 151 and corresponds to a water content of 8%. It is seen that at the lower $N:P_2O_5$ ratio the range of water contents is small, that is 2 to 3% and the temperaure is relatively high but at the higher $N:P_2O_5$ ratio the range of water contents giving a substantially homogeneous mixture is increased to 2 to 8% and the temperature at 8% water is much lower.

The water content of the homogeneous liquid mixture desirably has a maximum value of $(1.0+4N:P_2O_5)\%$ by weight and preferably has a maximum value of $4(N:P_2O_5)\%$ by weight. Desirably the minimum water content is 3%.

Preferably the weight ratio $N:P_2O_5$, as calculated from the N-content of the ammonium nitrate and the monoammonium phosphate and the $P_2O_5$ content of the monoammonium phosphate, is in the range 2.0:1.0 to 1.0:2.0.

The homogeneous liquid mixture is readily processed into a fertilizer material by any of a number of methods. For instance the homogeneous liquid mixture may be prilled by spraying into a gaseous cooling medium and the prills dried, if necessary. The homogeneous liquid mixture may also be discharged, for example on to a drum or belt cooler whereupon it solidifies and is removed as a hard flake which is broken up in a disintegrator to give a granular product of the desired size range. The fines material from the disintegration, normally between the limits 5–30% of the product material, may be returned to the head of the system and incorporated in the melt or slurry. The fines material may be introduced with other components, such as potassium salts, where these are included.

The complete granular fertilizer from the flake breaker normally contains less than 2% moisture, and in many cases less than 1% moisture depending on the ratio of nutrients, temperature of preparation etc., and may or may not require further drying before passing to storage. It has further been found that because of the homogeneous and compact form of the granule arising from the sequence of water disengagement and particle formation, the storage properties of the granules are good, and these materials have been found to cake less than materials of the same overall composition made in the agglomerative granulation process. The storage properties are greatly enhanced when wet-process phosphoric acid as distinct from furnace grade acid is used as a starting material.

If desired the granular product may be mixed with other solid fertilizer components. These may be simply blended together, or may be subjected to a granulation process such as a compaction granulation process.

Alternatively, the melt may be subjected to a granulation process. Thus for example the slurry or melt may be mixed with the other components and injected into a rotary drier, for example as described in British Patent No. 775,114 or United States Patent No. 2,926,079. Alternatively the melt may be fed to a blunger or other mixer and the resulting product fed to a granulator. Alternatively the melt may be fed directly to a rotary granulator to which are also fed the other components of the final mixture.

The other fertilizer materials which may be admixed with the homogeneous liquid mixture include potassium salts, such as for example potassium chloride, potassium sulphate or potassium nitrate; ammonium sulphate, urea, superphosphates, trace element salts and the like. Preferably the other ingredients are potassium chloride and/or ammonium sulphate. The potassium salt may be mixed or blended in the melt, either forming a solution or a partial solution, or a suspension of the potassium salt in the melt.

The ease of solubility of the potassium salt in the melt is related to the proportion of ammonium nitrate in the melt. With higher ammonium nitrate contents rapid solution is obtained and the period of mixing is not very significant. With lower ammonium nitrate contents solution may not be obtained and the period of mixing should be as short as possible.

By the operation of this process it has been found that fertilizer materials which are essentially a mixture of water-soluble salts containing nitrogen, phosphorus and potassium can be prepared in such a way as to avoid many of the major problems encountered in the agglomerative granulation process for mixed fertilizers.

Thus in the embodiment of the invention where the components of the fertilizer are mixed in a fluid phase, the granular product is completely uniform physically and chemically and has good storage properties. Furthermore, the nitrogenous salts contained in these fertilizers can be manufactured in situ from primary raw materials immediately prior to product preparation without the need for separate preparation of the individual solid components.

The relative quantities of nitrogen and phosphorus, and potassium where present, employed in accordance with the present invention may vary over wide ranges. As regards the ammonium nitrate/ammonium phosphate mixture, the ratio of ammonium phosphate to ammonium nitrate may comprise from 3.1:1 to 1:9 by weight. The mixture may contain other components, for example water and ammonium sulphate, but essentially comprises ammonium nitrate and ammonium phosphate. According to one embodiment of the invention the ratio of ammonium phosphate to ammonium nitrate is in the range 2.5:1.5 to 1.5:8.5.

Any number of fertilizer compositions can be realised using the methods of the present invention and nutrient ratios $N:P_2O_5:K_2O$ by weight such as the following are possible 1:2:1, 1:2:2, 1:1:1, 2:1:1, 2:2:1, 2:1:2, etc.

The following experiments illustrate the impossibility of forming anhydrous or near anhydrous mixtures of ammonium nitrate and monoammonium phosphate merely by reacting anhydrous ammonia with a mixture of nitric and phosphoric acids.

EXPERIMENT A

A mixture of 144 parts per hour of commercial phosphoric acid ($P_2O_5=50\%$) and 440 parts per hour of 65% nitric acid were added continuously to a previously prepared melt having an $N:P_2O_5$ ratio of 2:1 and a moisture content of 8% w./w. This melt was contained in two stirred vessels connected so that the contents of the first vessel overflowed into the second vessel as the liquid mixture was fed into the first. Ammonia gas was added to both vessels in the proportions required to maintain the degree of neutralisation at an $NH_3:H_3PO_4$ molar ratio of 1:1 in the monoammonium phosphate present. The proportion of ammonia fed into the first vessel to that fed into the second vessel was 7:1.

The temperature of the vessel contents rose progressively as operation proceeded and the water content was consequently progressively lowered.

When the water content was 1.5% the temperatue of the mixture was 200° C. and ammonia losses increased rapidly. At a water content of 1% the temperature was 215° C. and it was found impossible to maintain the required degree of ammoniation even when feeding a very large excess of ammonia. Since it is known that acid solutions of ammonium nitrate may decompose violently above 215° C. the experiment was discontinued.

EXPERIMENT B

A melt consisting of 385 parts of ammonium nitrate, 268 parts of monoammonium phosphate and 2% water was prepared at 200° C. This melt was further heated in order to test whether temperatures sufficient to remove substantially all the moisture could be attained.

Dense white fumes were observed at 207° C. and the mixture lost ammonia until the $NH_3:P_2O_5$ in the monoammonium phosphate fell to 0.83:1. At 213° C. the $NH_3:P_2O_5$ ratio fell from the initial value of 0.43:1 to 0.39:1 and a further rapid decrease occurred as the temperature was increased, showing that the ammonium nitrate present was either decomposing or vaporising from the solution.

It was concluded that it is impossible to obtain a substantially anhydrous melt by preparing by ammoniation a mixture of ammonium nitrate and monoammonium phosphate and raising the melt to a sufficiently high temperature to remove substantially all the water present.

EXPERIMENT C

A mixture of 47.7 parts of wet phosphoric acid ($P_2O_5=50\%$) and 52.3 parts by weight of ammonium nitrate were ammoniated at 140° C. to pH 4 in an agitated vessel. A thick slurry was formed and the experiment had to be stopped owing to the operating difficulties. The product made had a weight ratio $N:P_2O_5$ of 1.0.

The following examples are given to illustrate the present invention.

*Example 1*

A molten mixture of ammonium nitrate and monoammonium phosphate and 4.5% water at its boiling point of 165° C. was agitated in a vessel provided with an overflow while adding thereto 47.7 parts of 50% $P_2O_5$ wet-process phosphoric acid per hour, 52.3 parts of ammonium nitrate, 6.2 parts of ammonia per hour and 8.5 parts of water per hour. Ammoniation occurred at the boiling point without thickening of the melt or blockages. A melt was obtained having a weight ratio $N:P_2O_5$ of 1:1 and a water content of 4.5% w./w.

*Example 2*

61.5 parts by weight of the 1:1 $N:P_2O_5$ melt formed in Example 1 were sprayed on to 38.5 parts by weight of muriate of potash ($K_2=60\%$) and 50 parts of recycled fines in a rotary granulator. Granulation occurred at a temperature of 129° C. Over 66.6% of the product made passed through a three-sixteenth inch B.S.S. sieve and was retained on a one-sixteenth inch B.S.S. sieve. The granule fraction minus three-sixteenth inch plus one-sixteenth inch analysed in the ratio $N:P_2O_5:K_2O=1:1:1.5$ and contained 0.1% w./w. of water. The granules did not show any appreciable tendency to cake after four weeks storage under a pressure equivalent to that experienced in the bottom bag in a pile of one-hundred weight bags, 25 bags high.

*Example 3*

61.5 parts by weight of the 1:1 $N:P_2O_5$ melt were sprayed on to a mixture of 38.5 parts of muriate of potash ($K_2O=60\%$), 3 parts of urea and 51½ parts of recycled fines in a rotary drum granulator. Granulation occurred at a temperature of 105° C. Over 66.6% of the product made passed through a three-sixteenth inch B.S.S. sieve and was retained on a one-sixteenth inch B.S.S. sieve. The granule fraction minus three-sixteenth inch plus one-sixteenth inch analysed such that $N:P_2O_5:K_2O=1:1:1.5$ and contained 0.4 w./w. water.

*Example 4*

100 parts by weight of the 1:1 $N:P_2O_5$ melt were sprayed on to a mixture of 42 parts of muriate of potash, 120 parts of ammonium sulphate, in a rotary drum granulator. Granulation occurred at a temperature of 138° C. Over 50% of the product passed through a three-sixteenth inch B.S.S. sieve and was retained on a one-sixteenth inch B.S.S. sieve. The granule fraction minus three-sixteenth inch plus one-sixteenth inch analysed such that $$N:P_2O_5:K_2O=2:1:1$$

and contained 0.2% w./w. water. The product granules has good storage properties.

*Example 5*

A mixture of 53.5 parts of commercial phosphoric acid ($P_2O_5=50\%$), 46.5 parts by weight of ammonium nitrate and 7.5 parts of water were ammoniated with 6.57 parts of ammonia at 168° C. to a pH 4.0 in an agitated vessel. Ammoniation occurred without the formation of a thick slurry or blockages. A melt was obtained having a weight ratio $N:P_2O_5$ of 1:1.2 and a water content of 5% w./w.

*Example 6*

42.4 parts of the melt obtained by the process of Example 5 were sprayed onto a mixture of 15.2 parts of single superphosphate, 41.7 parts of muriate of potash and 59 parts by weight of recycled fines in a rotary drum granulator. Granulation occurred at 93° C. to produce granules of minus three-sixteenth inch plus one-sixteenth inch of water content 2.4% w./w. and $N:P_2O_5:K_2O=1:1½:2½$. The granulation temperature was maintained by gas heating and addition of steam.

*Example 7*

44 parts of water per hour, 144 parts of commercial phosphoric acid ($P_2O_5=50\%$) and 440 parts of 65% nitric acid were ammoniated with 93.2 parts ammonia at 153° C. to pH 4.0 in a stirred tank reactor. A melt was obtained having a ratio $N:P_2O_5$ of 2:1 and a moisture content of 8% w./w. Ammoniation occurred without the formation of a thick slurry.

*Example 8*

100 parts of melt prepared as in Example 10 were sprayed on to a mixture of 24 parts of muriate of potash ($K_2O=60\%$) and 62 parts by weight of recycled fines in a rotary granulation drum. Granulation occurred at a temperature of 119° C. Over 66.6% of the product obtained passed through a three-sixteenth inch B.S.S. sieve and was retained on a one-sixteenth B.S.S. sieve. The granule fraction minus three-sixteenth inch plus one-sixteenth inch analysed such that $N:P_2O_5:K_2O=2:1:1$ and contained 0.2 w./w. of water. The product was found to have excellent storage properties.

*Example 9*

A mixture of 35.8 parts of 50% $P_2O_5$ wet-process phosphoric acid and 68.8 parts of 95% ammonium nitrate were preheated to 128° C. and ammoniated in a tubular reactor to a pH of 4.0, which gave a maximum temperature of 156° C. A reactor length-to-diameter ratio of 300 gave excellent ammonia conversion. A melt was obtained having a $N:P_2O_5$ weight ratio of 1.5 and a water content of 3.6% w./w.

*Example 10*

A mixture of 35.4 parts of 50% $P_2O_5$ wet-process phosphoric acid, 65.8 parts of 95% ammonium nitrate and 2.5 parts of 98% sulphuric acid were preheated to 128° C. and ammoniated in a tubular reactor to a pH of 4.0 which had a maximum temperature of 165° C. A tube length-to-diameter ratio of 300 gave excellent ammonia conversion. A melt was obtained having an $N:P_2O_5$ weight ratio of 1.5 and a water content of 3.0% w./w.

*Example 11*

61.5 parts by weight of 1:1 $N:P_2O_5$ melt were dribbled on to 38.5 parts of muriate of potash ($K_2O = 60\%$) and 200 parts of recycled fines in an unheated pugmill. Agglomeration occurred from which 33.3% of the product obtained passed through a three-sixteenth inch B.S.S. sieve and was retained on a one-sixteenth B.S.S. sieve. The granule fraction minus three-sixteenth inch plus one-sixteenth inch analysed such that the $N:P_2O_5:K_2O$ ratio was 1:1:1.5 and the fertilizer contained 0.4% w./w. water.

*Example 12*

An aqueous solution containing 20 parts of wet-process phosphoric acid (50% $P_2O_5$), 35 parts 65% nitric acid, 9.6 parts commercial monoammonium phosphate, 47.5 parts ammonium nitrate and no water at a temperature of 80° C. was fed to a cyclindrical reactor at 112 parts per hour. Concurrently to this ammonia was fed at 8.8 parts per hour. The cylindrical reactor had the following dimension ratios:

$$\frac{\text{Overall height}}{\text{Inside diameter}} = \frac{13}{8} \qquad \frac{\text{Depth to overflow}}{\text{nside diameter I}} = \frac{9}{8}$$

The temperature in the reactor was maintained at 170° C. due to the heat of ammoniation. The product leaving the reactor was a homogeneous liquid mixture having a temperature of 170° C. and a ratio of $N:P_2O_5$ of 2:1. The water content of the product was 5 parts per 100 parts of product.

We claim:
1. A process for the production of compound fertilizers which comprise ammoniating an acid mixture consisting of a mixture of compounds selected from the group consisting of ammonium nitrate, monoammonium phosphate, nitric acid and phosphoric acid and containing at least phosphate and nitrate anions, hydrogen cations, ammonium cations and water to give a substantially homogenous liquid mixture comprising ammonium nitrate, monoammonium phosphate and water maintained at approximately its boiling point, recovering the substantially homogenous liquid mixture and processing it to obtain a granular fertilizer product, the homogeneous liquid mixture having (1) a weight ration $N:P_2O_5$ as calculated from the N-content of the ammonium nitrate and the monoammonium phosphate and the $P_2O_5$ content of the monoammonium phosphate, in the range 0.64 to 2.1, (2) a boiling point greater than T° C., T being equal to $158(N:P_2O_5)^{-0.11}$ and (3) a water content which is at a level between a minimum value of 2% by weight and a maximum value of W. by weight, the percentage weight being based on the weight of the homogeneous liquid mixture and W being equal to $(2+4N:P_2O_5)$.

2. A process as claimed in claim 1 wherein said acid mixture comprises phosphoric acid and a nitrate selected from the group consisting of nitric acid and ammonium nitrate.

3. A process as claimed in claim 1 wherein said acid mixture comprises phosphoric acid, sulphuric acid and a nitrate selected from the group consisting of nitric acid and ammonium nitrate.

4. In a process for the production of compound fertilizers which comprises ammoniating an acid mixture consisting of a mixture of compounds selected from the group consisting of ammonium nitrate, monoammonium phosphate, nitric acid and phosphoric acid and containing at least phosphate and nitrate anions, hydrogen cations, ammonium cations and water to give a substantially homogeneous liquid mixture comprising ammonium nitrate, monoammonium phosphate and water maintained at approximately its boiling point, recovering the substantially homogeneous liquid mixture and processing it to obtain a fertilizer product, the improvement wherein the acid mixture is ammoniated by a process which comprises: adding the components of the said acid mixture and ammonia to a pool of said homogeneous liquid mixture in such proportions as to maintain the homogeneous liquid mixture at substantially the same $N:P_2O_5$ ratio, temperature and water content and wherein the homogeneous liquid mixture has (1) a weight ratio $N:P_2O_5$ as calculated from the N-content of the ammonium nitrate and the monoammonium phosphate and the $P_2O_5$ content of the monoammonium phosphate in the range of 0.64 to 2.1, (2) a boiling point greater than T° C.., T being equal to $158(N:P_2O_5)^{-0.11}$ and (3) a water content which is at a level between a minimum value of 2% by weight and a maximum value of W% by weight, the percentage weight being based on the weight of the homogeneous liquid mixture and W being equal to $(2+4N:P_2O_5)$.

5. A process as claimed in claim 4 wherein said acid mixture comprises phosphoric acid and a nitrate selected from the group consisting of nitric acid and ammonium nitrate.

6. A process for the continuous production of compound fertilizers which comprises:
(A) feeding 47.7 parts per hour of 50% $P_2O_5$ wet-process phosphoric acid, 52.3 parts per hour of ammonium nitrate, 6.2 parts per hour of ammonia and 8.5 parts per hour of water into a reaction vessel provided with overflow means and with stirring means and containing a melt of ammonium nitrate and monooammonium phosphate said melt having a temperature of about 165° C. and containing about 4.5% water, while agitating said melt with said stirring means; and
(B) continuously removing through said overflow means an amount of said melt as final product sufficient to maintain the melt at a substantially constant level, the amount of melt removed from the system corresponding to the amount of feed being introduced.

References Cited by the Examiner

UNITED STATES PATENTS

| | | | |
|---|---|---|---|
| 2,657,977 | 11/1953 | Stergel et al. | 71—64 |
| 2,798,801 | 7/1957 | Kieffer et al. | 71—64 |
| 2,857,262 | 10/1958 | Graham | 71—64 |
| 2,893,858 | 7/1959 | MacDonald et al. | 71—64 |
| 2,912,318 | 11/1959 | Kieweg | 71—64 |
| 2,957,763 | 10/1960 | Barnes et al. | 71—64 |
| 3,037,855 | 6/1962 | Smith | 71—64 |
| 3,050,385 | 8/1962 | Parker | 71—64 |

DONALL H. SYLVESTER, *Primary Examiner.*

ANTHONY SCIAMANNA, *Examiner.*